United States Patent
Wang et al.

(10) Patent No.: US 9,448,598 B2
(45) Date of Patent: Sep. 20, 2016

(54) POINT OF SALE DEVICE

(71) Applicant: ENNOCONN CORPORATION, New Taipei (TW)

(72) Inventors: Kun-Ming Wang, New Taipei (TW); Shih-Chi Liu, New Taipei (TW)

(73) Assignee: ENNOCONN CORPORATION, New Taipei (TW)

( * ) Notice: Subject to any disclaimer, the term of this patent is extended or adjusted under 35 U.S.C. 154(b) by 65 days.

(21) Appl. No.: 14/591,577

(22) Filed: Jan. 7, 2015

(65) Prior Publication Data

US 2016/0147268 A1    May 26, 2016

(30) Foreign Application Priority Data

Nov. 25, 2014   (TW) .............................. 103140755 A

(51) Int. Cl.
*G06F 1/16*   (2006.01)
*G06F 1/18*   (2006.01)

(52) U.S. Cl.
CPC ............... *G06F 1/182* (2013.01); *G06F 1/187* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 6,003,008 | A * | 12/1999 | Postrel | ................... | G06F 1/183 235/381 |
| 6,053,410 | A * | 4/2000 | Wike, Jr. | ................... | G06F 1/16 235/462.43 |
| 6,053,411 | A * | 4/2000 | Nugent, Jr. | .......... | G07G 1/0018 235/462.43 |
| 6,053,412 | A * | 4/2000 | Wike, Jr. | ................... | G06F 1/16 235/375 |
| 6,062,478 | A * | 5/2000 | Izaguirre | ................... | G06F 1/16 235/462.43 |
| 6,807,055 | B2 * | 10/2004 | Usui | ..................... | G06F 1/1632 361/679.4 |
| 7,017,803 | B2 * | 3/2006 | Ichikawa | ............. | G07G 1/0018 235/379 |
| 7,146,325 | B2 * | 12/2006 | Yamakawa | .......... | G06Q 10/083 705/21 |
| 7,652,876 | B2 * | 1/2010 | Moscovitch | ........... | F16M 11/04 345/1.3 |
| D614,687 | S * | 4/2010 | Ono | ............................. | D18/4.5 |
| D615,583 | S * | 5/2010 | Ono | ............................. | D18/4.5 |
| 8,179,671 | B2 * | 5/2012 | Kaneko | ................... | G06F 1/187 361/679.34 |
| 8,550,343 | B2 * | 10/2013 | Ko | ....................... | G07F 7/0886 235/383 |
| 8,982,550 | B2 * | 3/2015 | Kaneko | ................... | G06F 1/187 361/679.34 |
| 2004/0150945 | A1 * | 8/2004 | Mache | ................... | F16M 11/00 361/679.21 |
| 2010/0177473 | A1 * | 7/2010 | Wu | ........................ | F16M 11/10 361/679.21 |
| 2012/0224317 | A1 * | 9/2012 | Cheng | .................. | G07G 1/0018 361/679.21 |
| 2015/0077916 | A1 * | 3/2015 | Liu | ....................... | G06F 1/1613 361/679.27 |
| 2015/0149311 | A1 * | 5/2015 | Ward | ................... | G07G 1/0018 705/24 |
| 2016/0005274 | A1 * | 1/2016 | Wang | ................... | G07G 1/0018 361/679.58 |

FOREIGN PATENT DOCUMENTS

| | | |
|---|---|---|
| TW | M299885 | 10/2006 |
| TW | M322036 | 11/2007 |
| TW | 201131335 | 9/2011 |

* cited by examiner

*Primary Examiner* — Lisa Lea Edmonds
(74) *Attorney, Agent, or Firm* — Zhigang Ma

(57) ABSTRACT

A point of sale (POS) device is provided that includes a main body having a receiving space, a cover that is rotatably connected to the main body for covering the receiving space, a circuit board, and a storage device that is removably mounted in the cover. The POS device further includes two displays that are mounted outside of the main body and the cover. The main body and the cover are mechanically coupled by two hinges and a lock. Two ends of each hinge are respectively connected to inner sides of the cover and the main body at a first side. The lock is provided at a second side, which is opposite the first side, to lock the cover to the main body.

10 Claims, 5 Drawing Sheets

POINT OF SALE DEVICE

FIELD

The subject matter herein generally relates to a point of sale (POS) device.

BACKGROUND

A cover of a traditional point of sale (POS) device is assembled by screws and rivets.

BRIEF DESCRIPTION OF THE DRAWINGS

Implementations of the present technology will now be described, by way of example only, with reference to the attached figures.

DETAILED DESCRIPTION

Figure 1:
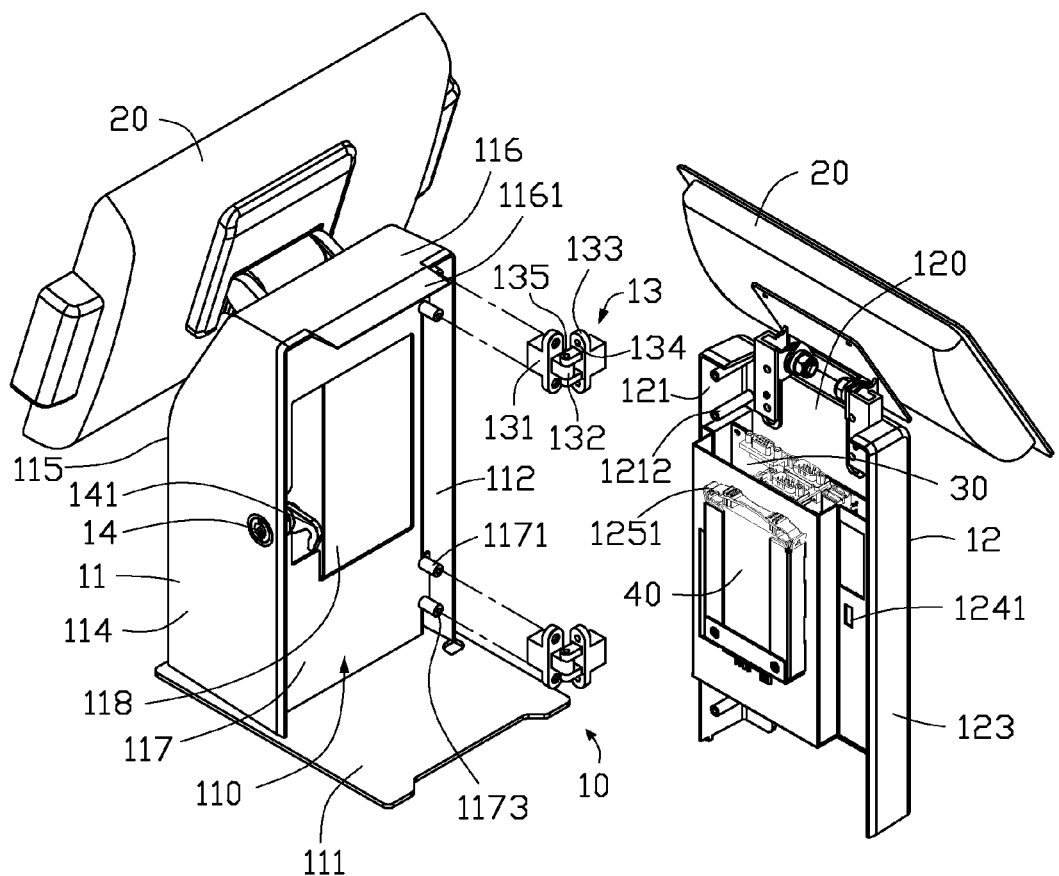
FIG. 1 is an exploded, isometric view of an embodiment of a point of sale (POS) device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a point of sale (POS) device.

Figure 2:
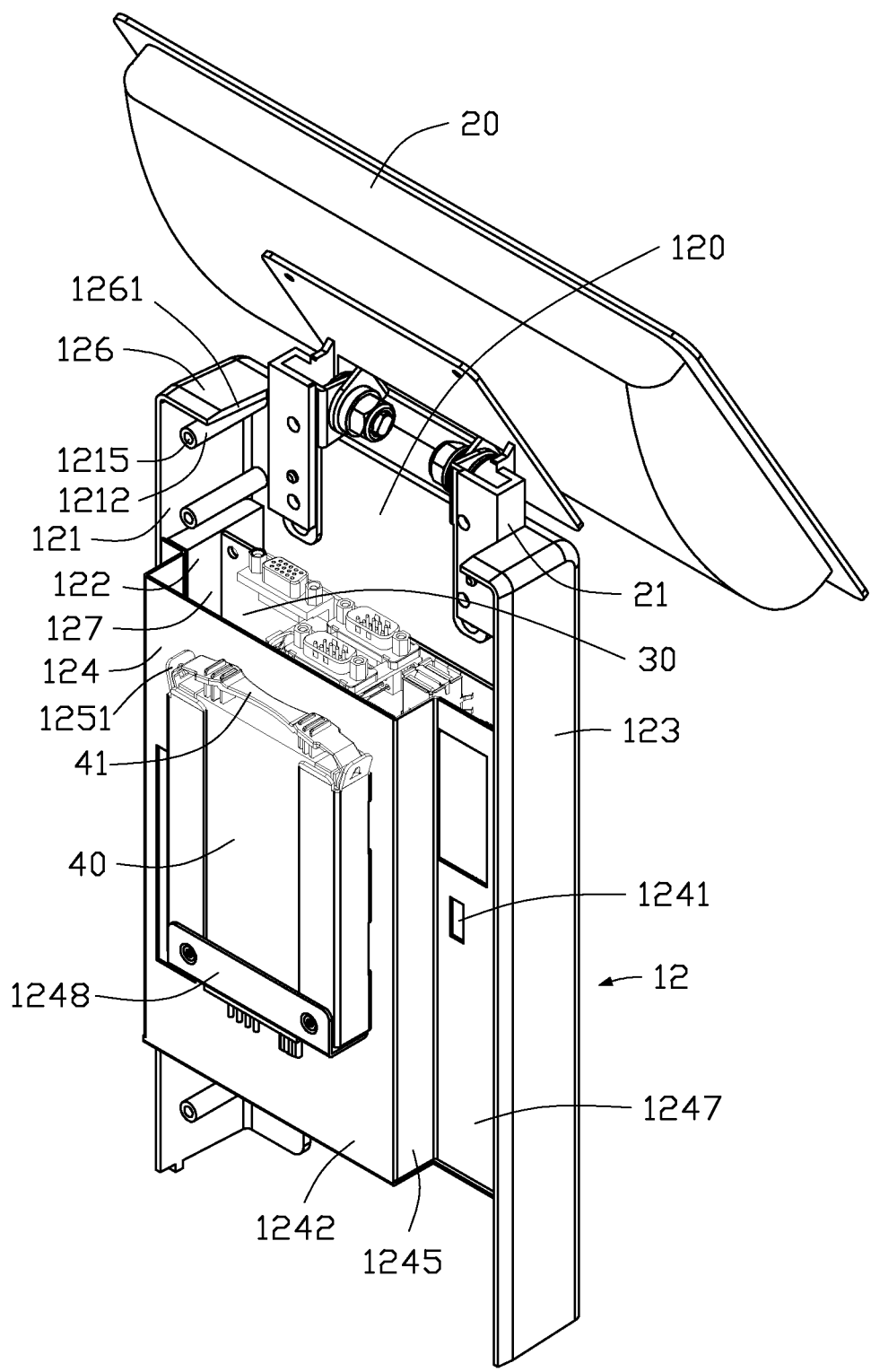
FIG. 2 is a partial enlarged view of FIG. 1.

FIG. 1 and FIG. 2 illustrate an embodiment of a POS device. The POS device comprises a housing 10, two displays 20, a circuit board 30, and a storage device 40.

The housing 10 comprises a main body 11, a cover 12, and a plurality of hinges 13.

The main body 11 comprises a base board 111, a first side board 112, a second side board 114, an outer board 115, a top board 116, and a support board 117. The first side board 112 and the second side board 114 are connected to two opposite sides of the base board 111. The outer board 115 is attached to the base board 111, the first side board 112, and the second side board 114. The top board 116 is attached to the first side board 112, the second side board 114, and the outer board 115. The support board 117 is attached to the base board 111, the top board 116, the first side board 112, and the second side board 114, and is opposite to the outer board 115. A side of the support board 117 back to the outer board 115, the base board 111, the top board 116, the first side board 112, and the second board 114 cooperatively define a receiving space 110. An opening 118 is defined on a middle portion of the support board 117. Two pairs of fixing pillars 1171 respectively protrude from a top and a bottom of the support board 117, near the first side board 112. Each fixing pillar 1171 defines a connecting hole 1173 perpendicular to the support board 117. A lock 14 is installed on a middle portion of the second side board 114 away from the outer board 115. A latch 141 is mounted to an inner side of the second side board 114 and connected to the lock 14. The latch 141 can be controlled by the lock 14 to rotate out of the receiving space 110. A tab 1161 protrudes from the top board 116 away from the outer board 115. One of the displays 20 is rotatably installed on the outer board 115, near the top board 116. The base board 111, the first side board 112, the second board 114, the outer board 115, the top board 116, and the support board 117 cooperatively define a mounting space, for installing a keyboard, a cashbox, and other apparatus.

The cover 12 comprises a base plate 120, a first side plate 121, a second side plate 123, a top plate 126, and a mounting bracket 124. The first side plate 121 and the second side plate 123 perpendicularly extend inward from two opposite sides of the base plate 120. The top plate 126 protrudes inward from a top edge of the base plate 120 and is attached to the first side plate 121 and the second side plate 123. A notch 1261 is defined in a middle portion of the top plate 126. The other display 20 is rotatably installed on the outside of the top of the cover 12 by a connecting bracket 21 extending through the notch 1261 and fixed to the base plate 120. Two pairs of fixing pillars 1212 respectively protrude from a top and a bottom of the base plate 120, near the first side plate 121. Each fixing pillar 1212 defines a connecting hole 1215 perpendicular to the base plate 120. Two connecting portions 122 protrude from inner sides of the first side plate 121 and the second side plate 123.

The mounting bracket 124 comprises a mounting plate 1242 parallel to base plate 120, two extending plates 1245 extending from two opposite side edges of the mounting plate 1242 toward the base plate 120, and two fixing plates 1247 respectively extending outward from edges of the extending plates 1245 away from the mounting plate 1242. The fixing plates 1247 are fixed on the connecting portions 122, respectively. The base plate 120, the connecting portions 122, and the mounting bracket 124 cooperatively define a housing space 127. The circuit board 30 is received in the housing space 127, with connectors of the circuit board 30 facing up. A locking hole 1241 is defined in a middle of the fixing plate 1247 near the second side plate 123. A storage device mounting bracket 1248 is installed on a middle portion of the outer surface of the mounting plate 1242. The storage device mounting bracket 1248 is U-shaped and defines a top opening receiving groove 1250 (shown in FIG. 5) for receiving the storage device 40. Two fixing portions 1251 are respectively formed on tops of two opposite sides of the storage device mounting bracket 1248. The storage device 40 can slide into the receiving groove 1250 and a resilient handle 41 coupled to an end of the storage device 40 can be latched to the fixing portions 1251.

Each hinge 13 comprises two fixing blocks 131. Each fixing block 131 is rotatably connected to a plurality of connecting sheets 132. The connecting sheets 132 of one fixing block 131 overlap with the connecting sheets 132 of the other fixing block 131; and the connecting sheets 132 of the two fixing blocks 131 are rotatably connected to a shaft 135 extending through the connecting sheets 132. Two fixing sheets 133 respectively extend from a top and a bottom of each fixing block 131, near the corresponding connecting sheets 132. Each fixing sheet 133 defines a through hole 134.

Figure 3:
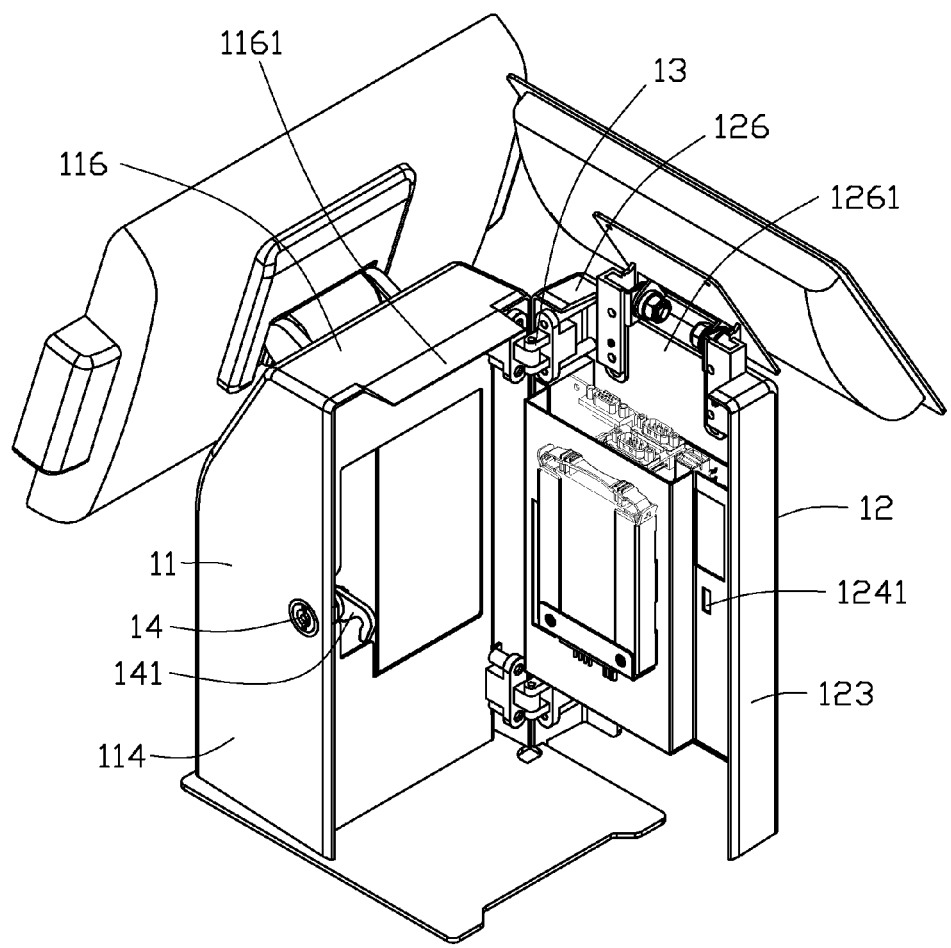
FIG. 3 is a partial assembled, isometric view of the POS device of FIG. 1.

FIG. 3 illustrates an assembled, isometric view of the POS device of FIG. 1. In assembly, one of the fixing blocks 131 of each hinge 13 can be placed into the receiving space 110, adjacent to the first side board 112, and between one pair of fixing pillars 1171. The through holes 134 of the fixing sheets 133 directly face the corresponding connecting holes 1173 of the fixing pillars 1171. A plurality of fasteners can extend through the through holes 134 to engage in the connecting holes 1173, fastening the hinges 13 to the main body 11. Another fixing block 131 of hinges 13 can be placed into the cover 12, adjacent to the first side plate 121, and between the corresponding pair of fixing pillars 1212. The through holes 134 of the fixing sheets 133 directly face the corresponding connecting holes 1215 of the fixing pillars 1212. A plurality of fasteners can extend through the through holes 134 to engage in the connecting holes 1215, fastening the hinges 13 to the cover 12. Then, the cover 12 is rotatably installed to the main body 11.

Figure 4:
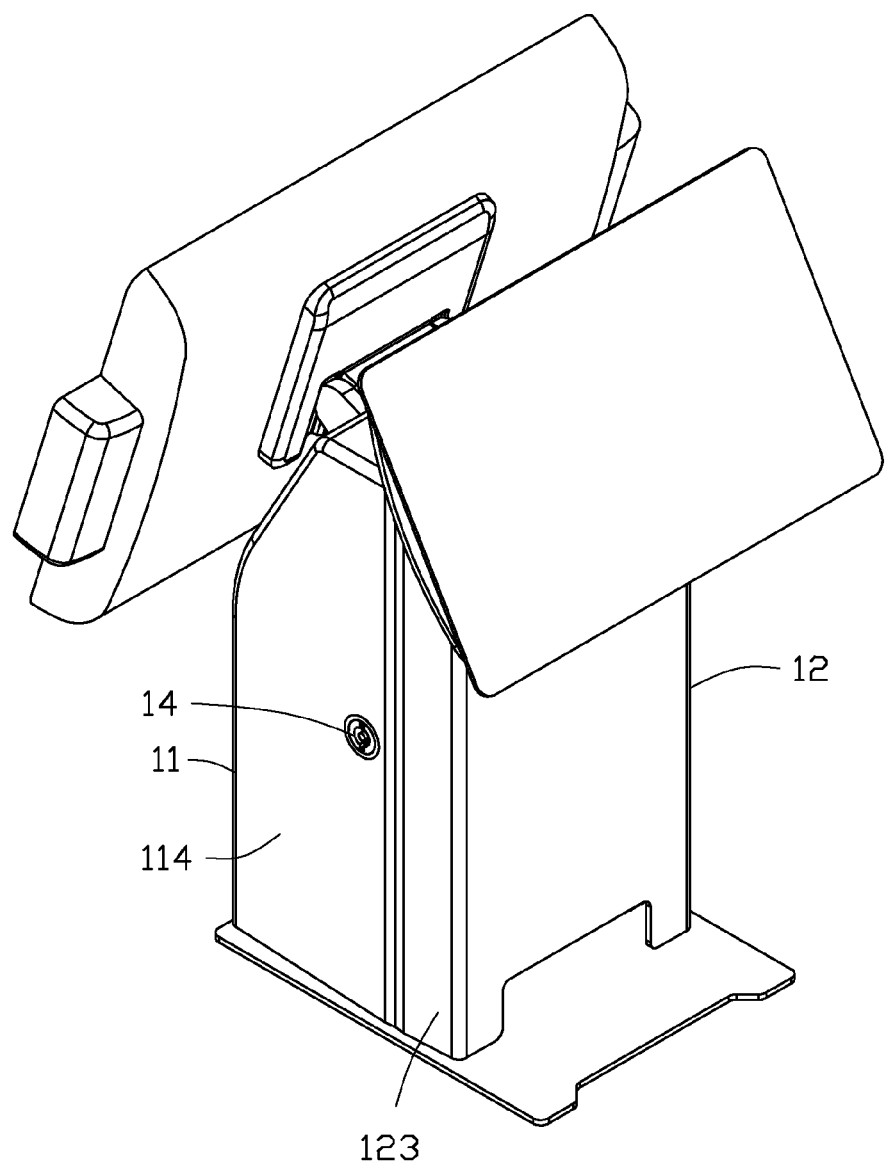
FIG. 4 is an assembled, isometric view of the POS device.

FIG. 4 illustrates an isometric view of the POS device at a working state. Before working, the cover 12 can be rotated to cover the main body 11. The first side plate 121 can be rotated to attach the first side board 112, the second side plate 123 can be rotated to attach the second side board 124, and the tab 1161 of the top board 116 can cover the notch 1261 of the top plate 126. The lock 14 can be operated to control the latch 141 to extend through then lock with the locking hole 1241 of the cover 12. Then, the cover 12 is fastened to the main body 11; the storage device bracket 1248 extends through the opening 118 to be received between the outer board 115 and the support board 117.

Figure 5:
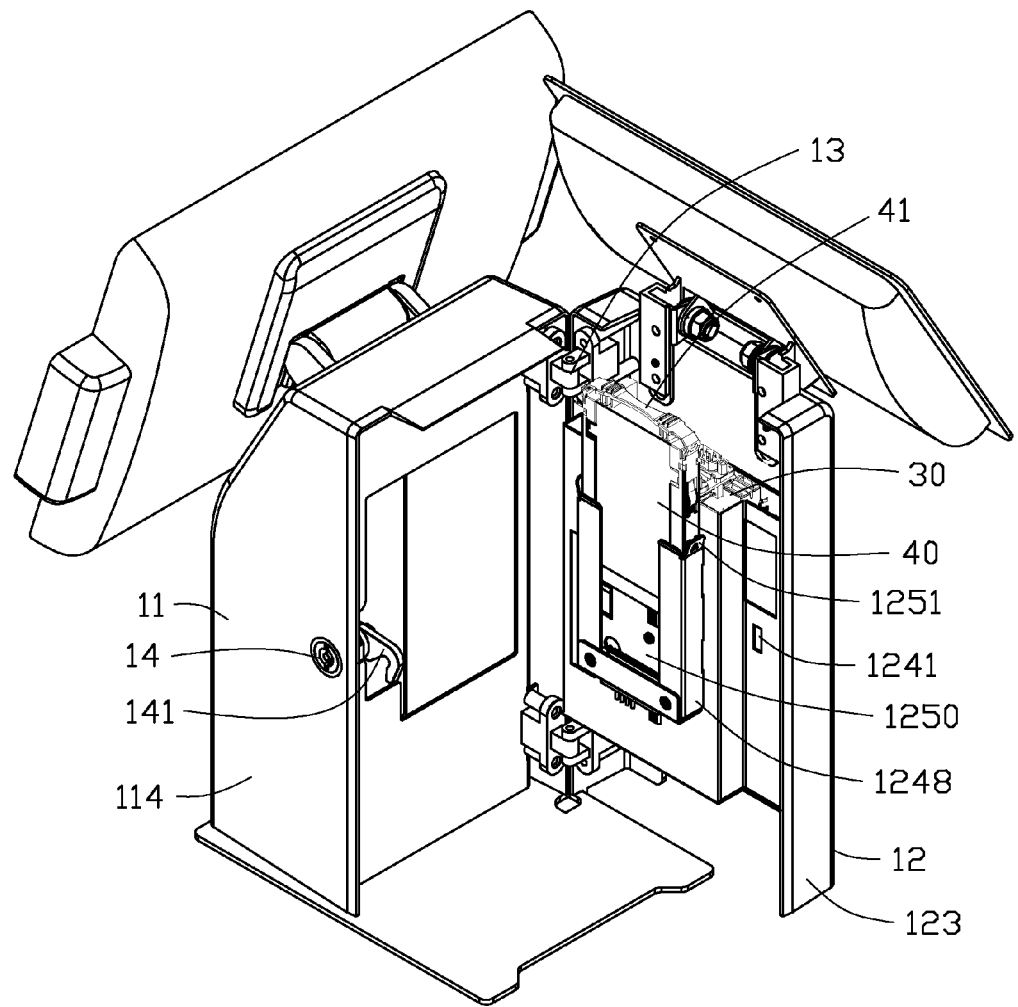
FIG. 5 is an isometric view of the POS device in an open state.

FIG. 5 illustrates an isometric view of the POS device in maintenance. During maintenance, the lock 14 can be operated to control the latch 141 to release the locking hole 1241. The cover 12 can be rotated away from the main body 11. The handle 41 can be operated to remove the storage device 40 from the receiving groove 1250. The mounting bracket 124 can be taken down, for further maintenance of the circuit board 30.

In another embodiment, each fixing block 131 and the corresponding connecting sheets 132 can be an organic whole.

The embodiments shown and described above are only examples. Many details are well known by those in the art therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A point of sale (POS) device comprising:
a main body defining a receiving space;
a cover rotatably connecting with the main body and covering the receiving space;
a circuit board attached to an inside of the cover;
a storage device coupled with the circuit board;
two displays respectively attached to the main body and the cover; and
a lock capable of fastening the main body to the cover.

2. The POS device of claim 1, wherein a pair of hinges are disposed between the cover and the main body, each hinge comprises two fixing blocks and a plurality of connecting sheets extending from each fixing block, the connecting sheets of one fixing block is rotatably attached to the connecting sheets of another fixing block, two fixing sheets extend from two opposite ends of each fixing block, for connecting with the main body or the cover.

3. The POS device of claim 2, wherein each fixing block is rotatably attached to the corresponding connecting sheets, the connecting sheets of the two fixing blocks are overlapped and rotatably attached to each other by a shaft extending through the connecting sheets.

4. The POS device of claim 2, wherein two pairs of fixing pillars extend from each of the main body and the cover.

5. The POS device of claim 4, wherein each fixing sheet defines a through hole, each fixing pillar defines a connecting hole, a plurality of fasteners respectively extends through the through holes to engage in the corresponding connecting holes.

6. The POS device of claim 5, wherein the main body comprises a base board, a first side board and a second side board formed at two opposite edges of the base board, an outer board formed at an end of the base board, a top board connected to top portions of the first side board, the second side board, and the outer board, a support board is perpendicularly attached to the base board between the first side board and the second side board, the fixing pillars of the main body extend from a side of the support board away from the outer board, near the first side board.

7. The POS device of claim 6, wherein the cover comprises a base plate, a first side plate and a second side plate perpendicularly extending inward from two opposite side edges of the base plate, a top plate extending perpendicularly inward from a top edge of the base plate, the fixing pillars of the cover extend from an inside surface of the base plate, near the first side plate.

8. The POS device of claim 7, wherein the cover further comprises a mounting bracket attached to the inside surface of the base plate, two connecting portions extend from inner sides of the first side plate and the second side plate, the mounting bracket comprises a mounting plate directly facing the base plate, two extending plates extend toward the base plate from two opposite side edges of the mounting plate, two fixing plates extend from an edge of the extending plate away from the mounting plate and are fixed on the corresponding connecting portions, the circuit board and the storage device are attached to the mounting plate of the mounting bracket.

9. The POS device of claim 8, wherein a locking hole is defined in a middle of one of the fixing plates located near the second side plate, the lock comprises a latch controlled to extend through the locking hole to be locked in the locking hole.

10. The POS device of claim 6, wherein an opening is defined in a middle of the support board to receive the storage device therethrough.

* * * * *